United States Patent
Spilker et al.

(10) Patent No.: US 8,779,304 B2
(45) Date of Patent: Jul. 15, 2014

(54) DEVICE FOR FIXING A CABLE TO A CABLE OUTLET SOCKET

(75) Inventors: Nicole Spilker, Luebbecke (DE); Bernard Schlegel, Rahden (DE)

(73) Assignee: Harting Electric GmbH & KG, Espelkamp (DE)

( * ) Notice: Subject to any disclaimer, the term of this patent is extended or adjusted under 35 U.S.C. 154(b) by 0 days.

(21) Appl. No.: 13/991,475

(22) PCT Filed: Aug. 31, 2011

(86) PCT No.: PCT/DE2011/075205
§ 371 (c)(1),
(2), (4) Date: Jun. 4, 2013

(87) PCT Pub. No.: WO2012/079571
PCT Pub. Date: Jun. 21, 2012

(65) Prior Publication Data
US 2013/0277105 A1 Oct. 24, 2013

(30) Foreign Application Priority Data
Dec. 7, 2010 (DE) .......................... 10 2010 061 067

(51) Int. Cl.
H02G 3/22 (2006.01)
H02G 3/06 (2006.01)
H02G 3/08 (2006.01)

(52) U.S. Cl.
CPC ............... *H02G 3/22* (2013.01); *H02G 3/0616* (2013.01); *H02G 3/083* (2013.01)
USPC ........... 174/653; 174/650; 174/652; 439/462; 439/584; 277/602

(58) Field of Classification Search
USPC ............. 174/650, 653, 40 CC, 652, 655, 656, 174/657, 659, 664, 668, 72 A; 439/462, 439/463, 604, 606, 460, 461, 583, 584; 248/49, 62, 74.1, 74.2, 65, 68.1; 277/602
See application file for complete search history.

(56) References Cited

U.S. PATENT DOCUMENTS

| | | |
|---|---|---|
| 4,739,126 A | 4/1988 | Gutter et al. |
| 5,350,204 A | 9/1994 | Henniger |
| 6,350,955 B1 * | 2/2002 | Daoud .......................... 174/651 |

(Continued)

FOREIGN PATENT DOCUMENTS

| | | |
|---|---|---|
| DE | 2635613 | 2/1978 |
| DE | 3128541 | 2/1983 |

(Continued)

*Primary Examiner* — Angel R Estrada
(74) *Attorney, Agent, or Firm* — Jacobson Holman, PLLC.

(57) ABSTRACT

The invention relates to an apparatus for fixing a cable to a cable outlet stub (30), comprising a clamping sleeve (2), a spring element (10) and a locking ring (20), wherein the spring element (10) comprises at least one locking hook (15) which can be inserted into a peripheral groove (31) in the cable outlet stub (30) as a result of a movement of the locking ring (20) relative to the clamping sleeve (2), and wherein the locking hooks (15) of the spring element (10), as the locking ring (20) rotates into an end position of a first direction (locking direction), are fully inserted into the peripheral groove in the cable outlet stub (30), so that the clamping sleeve (2) is captively held on the cable outlet stub (30).

4 Claims, 7 Drawing Sheets

(56) References Cited

U.S. PATENT DOCUMENTS

Figure 1B:
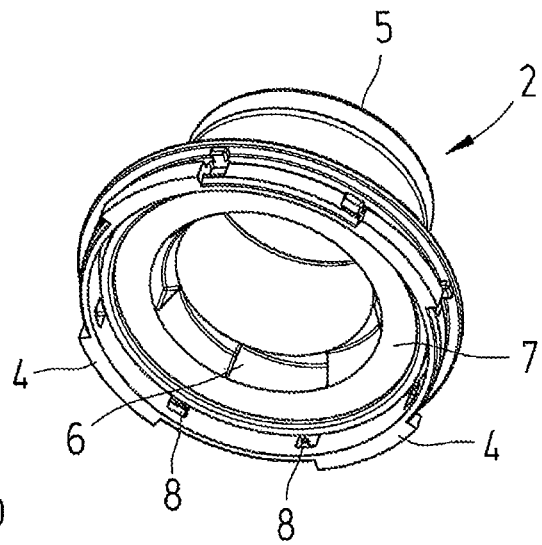

| | | |
|---|---|---|
| 6,537,104 B1 | 3/2003 | Hagmann et al. |
| 6,607,398 B2 * | 8/2003 | Henningsen ............ 439/584 |
| 7,735,876 B2 * | 6/2010 | Chiu ..................... 174/655 |
| 8,129,633 B1 * | 3/2012 | Shemtov ................ 174/655 |
| 8,288,667 B2 * | 10/2012 | Chiou .................... 174/655 |
| 8,701,520 B2 * | 4/2014 | Chiou .................... 174/652 |

FOREIGN PATENT DOCUMENTS

| | | |
|---|---|---|
| DE | 9402993 | 6/1994 |
| DE | 19849227 | 4/2000 |
| DE | 102008011978 | 9/2009 |
| EP | 0446466 | 9/1991 |
| EP | 0627588 | 11/1996 |
| GB | 2102637 | 2/1983 |

* cited by examiner

DEVICE FOR FIXING A CABLE TO A CABLE OUTLET SOCKET

This is a national stage of PCT/DE11/075205 filed Aug. 31, 2011 and published in German, which has a priority of German no. 10 2010 061 067.4 filed Dec. 7, 2010, hereby incorporated by reference.

The invention relates to a device for fixing a cable to a cable outlet socket, comprising a clamping sheath, a spring element, and a locking ring.

Such devices for fixing a cable to a cable outlet socket are required to hold cables to cable outlets of plug-in connection housings, switchboards, or the like in a torque-proof and tension-secured fashion.

EP 0 627 588 B1 shows a cable screw connection to securely fix a cable to a cable outlet socket. The socket is provided with individual, flexible clamping latches, which, when a cap nut is screwed on, are guided against a seal pushed over the cable jacket and thus simultaneously clamp the seal and the cable.

When the clamping latches are compressed it can occur that the compression applied via the seal upon the cable fails to reach sufficient strength to secure the cable against distortion and tension.

DE 3 128 541 C1 shows a cable screw connection with a securing against unintentional separation. However, here the cable screw connection requires a particular tool.

DE 198 49 227 C1 shows a cable fastening for the fixation of a cable to a cable outlet socket. The cable fastening comprises an exterior pressure ring, which in turn comprises latching arms distributed evenly over the circumference and projecting axially. The latching arms engage a circumferential groove of an internal metallic pressure ring and this way hold it tightly and prevent it from being lost. The internal pressure ring is a part of the cable fastening. In order to hold the cable at the cable outlet socket a clamping spring is tightened about the cable jacket when the cable fastening is being screwed onto the cable outlet socket.

DE 26 356 13 C3 shows a cable fixing device, which is formed from a clamping sheath, which in turn comprises so-called clamping jaws. The clamping jaws are made from an elastic material and comprise teeth projecting radially inwardly, which serve for releasing tension upon the cable. The clamping sheath is fastened via a screw connection on the cable outlet socket.

Screw connections to fixate cables are disadvantageous, though, in that the parts to be screwed together can cant in reference to each other and thus the tightness of the screw connection in reference to media, such as dust and water, is compromised.

The objective of the invention comprises to suggest a cable fixation, which avoids the above-described defects and can be easily assembled.

The objective is attained in the characterizing features of claim 1.

Advantageous embodiments of the invention are disclosed in the dependent claims.

A cable tension release and sealing system is generally integrated in a cable fixation element, for example a cable screw connection. The cable fixation essentially comprises the components clamping sheath, spring element, and locking ring, which are in an effective connection to the cable tension release and sealing system and fixate a cable on a cable outlet socket of a plug-in connector housing. The cable may for example show several wires.

The cable tension release and sealing system comprises a tension release element and a sealing element. The tension release element is essentially formed like a coil spring and accordingly shows a helical structure. The word "helical" can also be considered equivalent to "coil-shaped" in the general use of terminology. At one side the tension release element is connected to the sealing element. The tension release element forms a functional unit with the sealing element, which is also called an effective connection.

The sealing element is embodied disk-shaped and centrally provided with an opening, with its diameter being smaller than the diameter of the cable to be connected.

Optionally the sealing element may also be provided with a so-called penetration membrane instead of an opening.

The side of the sealing element facing the direction of the cable outlet (the outside) is provided at the edge with concentrically circumferential lamellae, so-called compression lamellae. The opposite side (the inside) of the sealing element also comprises lamellae, so-called sealing lamellae, which encompass the opening for the cable to be connected. The sealing lamellae extend concentrically about the opening of the sealing element, which is provided for the cable. The cable is pushed during the assembly through the tension release element and through the openings of the sealing element and the clamping sheath.

Frequently the sealing element is made from a material with elastomer features (such as EPDM, NBR, PU, etc.). In this case the lamellae are already formed during the production process. The inside sealing lamellae ensure an improved sealing function between the sealing element and the cable jacket. The outside compression lamellae of the sealing element increase the sealing effect between the clamping sheath and the cable outlet socket.

The locking ring simultaneously encompasses the clamping sheath and the cable outlet socket. The clamping sheath comprises latching openings, in which an annular spring element is latched. For this purpose, the spring element comprises latching flaps, which engage the latching openings. The spring element further comprises latching hooks which project from the spring element in the axial direction.

The latching ring is supported in a rotational fashion about the cable outlet socket and the clamping sheath. It comprises locking contours directed inwardly in the radial direction. The locking contours are arranged at the lower edge of the clamping sheath circumferentially at the inside and at an equal distance from each other. When the locking ring is rotated, thus during a relative motion of the locking ring in reference to the clamping sheath, the locking contours of the locking ring are guided against the locking hooks of the spring element. This way the locking hooks are bent radially inwardly and guided into a circumferential groove of the cable outlet socket. This way a locking of the clamping sheath with the cable outlet socket is achieved.

The direction of rotation of the locking ring, at which the latching hooks of the spring element are guided into the circumferential groove of the cable outlet socket, is called the locking direction. In an opposite direction of rotation, the so-called opening direction, the latching hooks are again guided out of the effective range of the locking contour of the locking ring. Here, the latching hooks glide laterally along the locking contour and radially snap back outwardly as soon as they have left the effective range of the locking contours.

When no force is applied via the above-mentioned locking contours upon the latching hooks of the spring element they are in their so-called idle position. In their idle position the latching hooks still slightly engage the circumferential groove so that the clamping sheath cannot fall off the cable outlet socket.

As already mentioned the cable is inserted prior to the assembly of the cable fixation device into the opening of the funnel-shaped clamping sheath. Simultaneously it is surrounded by the helical tension release element and the sealing element connected thereto. The clamping sheath is surrounded in the lower section by the locking ring. Subsequently the clamping sheath is placed upon the cable outlet socket so that the locking ring simultaneously surrounds the upper section of the cable outlet socket.

As already mentioned the spring element comprises axially projecting latching hooks. The cable outlet socket comprises a circumferential groove, into which the latching hooks are inserted when the locking ring is rotated in the locking direction. When the end position of the locking direction is reached the latching hooks of the spring element completely engage the circumferential groove of the cable outlet socket. This way the clamping sheath encompassing the cable is held and/or fixated on the cable outlet socket.

In a particularly advantageous embodiment the latching hooks of the spring element engage the circumferential groove of the cable outlet socket already in their idle position. In order to hold the clamping sheath on the cable outlet socket it can be easily pushed onto the cable outlet socket. The latching hooks of the spring element initially slightly deviate radially backwards and then snap into the circumferential groove. However, this represents no complete fixation of the clamping sheath on the cable outlet socket. For this purpose another rotary motion of the locking ring is required in the locking direction. Only then a seal located between the clamping sheath and the cable outlet socket is compressed. This is explained in greater detail in the following.

The clamping sheath comprises oblong bars, which are located within one level and aligned radially outwardly. These bars are inserted into axial recesses of the locking rings when the clamping sheath and the locking ring are assembled. These recesses are enclosed by bars of the locking ring located at the inside. The bars of the clamping sheath and the locking ring extend diagonally in the opposite direction, seen in the level of the plug-in connection. In a relative motion of the locking ring towards the clamping sheath, thus during a rotary motion of the locking ring, both bars are compressed against each other so that the parts (clamping sheath and locking ring) are clamped to each other. This clamping is also called a bayonet connection.

When the bars are clamped the end position of the locking direction is reached as well and the latching hooks of the spring element engage the circumferential groove of the cable outlet socket.

The clamping socket partially encompasses the jacket area of the cable outlet socket. Inside the clamping sheath a circumferential edge is formed. The sealing element is arranged between said edge and the brim of the cable outlet socket.

By clamping the locking ring with the clamping sheath and the simultaneous fixation of the clamping sheath on the cable outlet socket the sealing element is clamped between the above-mentioned circumferential edge of the clamping sheath and the brim of the cable outlet socket.

The internal circumferential edge of the clamping sheath applies a force upon the compression lamellae of the sealing element. By the compression lamellae, circumferential at the edge, the contact area between the internal circumferential edge of the clamping sheath and the sealing element reduces. This way, a higher pressure is applied upon the seal using the same compression force.

In bars completely separated from each other, thus not clamped, the end position of the opening direction is reached and the latching hooks of the spring element are guided completely out of the circumferential groove of the cable outlet socket. Now the clamping sheath can be removed from the cable outlet socket.

Downstream of the cable outlet socket the cable is encompassed by the tension release element. The tension release element comprises contours at a first end, which can be guided into recesses of the cable outlet socket. This way, the tension release element is fixed at this end in a torque-proof fashion in reference to its axis.

At the second end the tension release element comprises latching hooks pointing radially outwardly. These latching hooks engage corresponding latching contours of the cable outlet socket so that the second end of the tension release element can be fixed in one direction in a torque-proof fashion. In case of a rotation in the other direction the flexible latching hooks glide off the latching contours.

Furthermore, the tension release element at the second end comprises entraining hooks pointing axially outwardly. The clamping sheath comprises entraining contours matching thereto at the inside. In a relative motion of the clamping sheath in reference to the tension release element in a first direction, the so-called tightening direction, the second end of the tension release element is moved and/or distorted in reference to the first end, which is fixed in the cable outlet socket.

The entraining contours are annularly aligned inside the clamping sheath along the cable opening. The neighboring entraining contours are off-set in reference to each other in the radial direction. In other words, seen in the clockwise direction the entraining contours extend radially outwardly in their direction of extension.

This way the helical structure of the tension release element can be tightened about the cable jacket. This will be explained in greater detail in the following.

The entraining contours of the clamping sheath are therefore shaped such that in a relative motion of the clamping sheath in reference to the tension release element in a second direction, thus opposite the direction of tightening, the entraining hooks of the tension release element glide along the entraining contours of the clamping sheath without here sufficient force being applied upon the entraining hooks which would cause a relative distortion of the ends of the tension release element. The entraining hooks are made from an elastically deformable material and, if necessary, easily deviate in the radial direction.

As already described above, the tension release element is embodied between it two ends in the form of a helix and/or a coil. This helical structure encompasses the cable jacket of the cable to be connected. By the above-described relative motion of the two ends of the tension release element in reference to each other the incline of the helical structure is changed. The radius of the helix is accordingly increased and/or reduced.

In case of a reduced radius the cable is constricted by the helical and/or coil shape of the tension release element and fixated. This way tension release is ensured for the cable.

By the oscillating motion of the clamping sheath in reference to the cable outlet socket the helical and/or coil-shaped part of the tension release element is tightened about the cable jacket.

In the rotary direction (the tightening direction) of the clamping sheath the latching hooks of the tension release element are further guided and the helical structure constricts about the cable jacket. In the other rotary direction the entraining structures glide off the entraining structures of the clamping sheath. The device acts like a so-called ratchet.

In an advantageous embodiment the tension release element shows a first and a second helical structure. The structures are aligned opposite each other, i.e. one is embodied clockwise and the other one counter-clockwise. In such a double helix the constricted cable jacket is always centered, i.e. aligned along the axis of the tension release element.

Figure 1C:
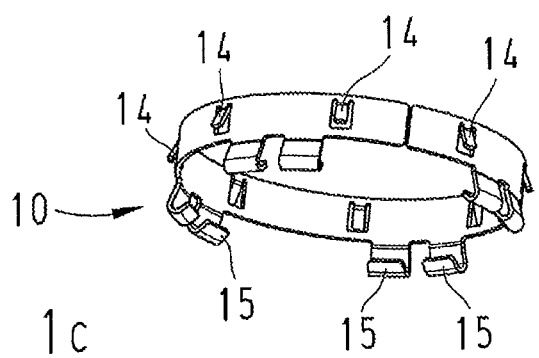
Figure 1A:
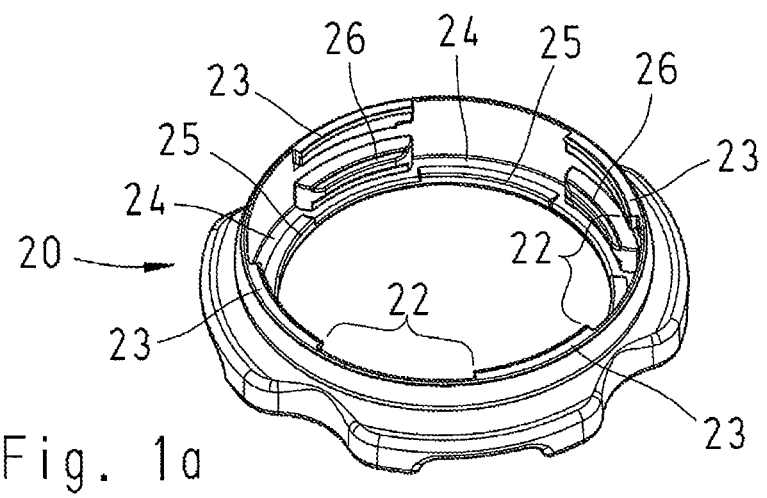
Figure 2:
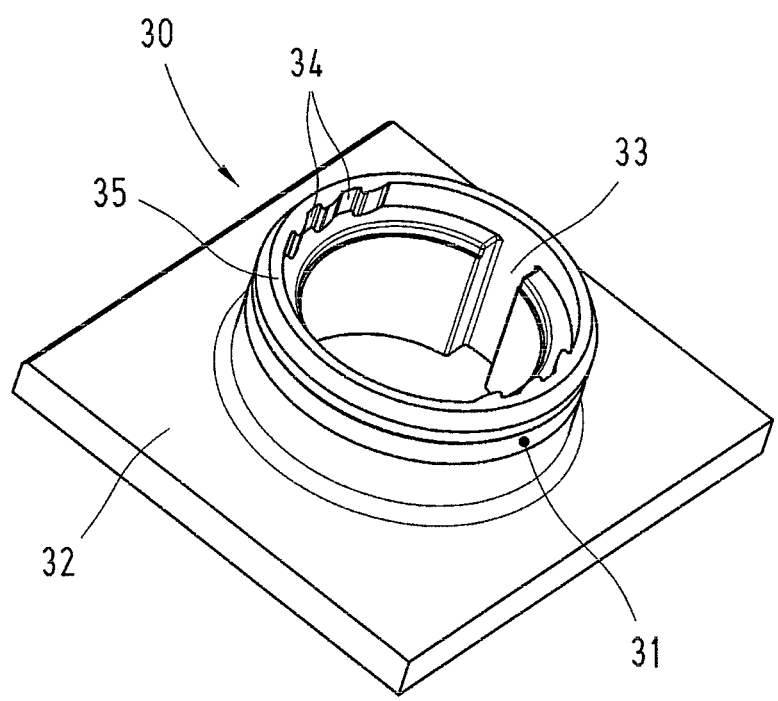
Figure 3:
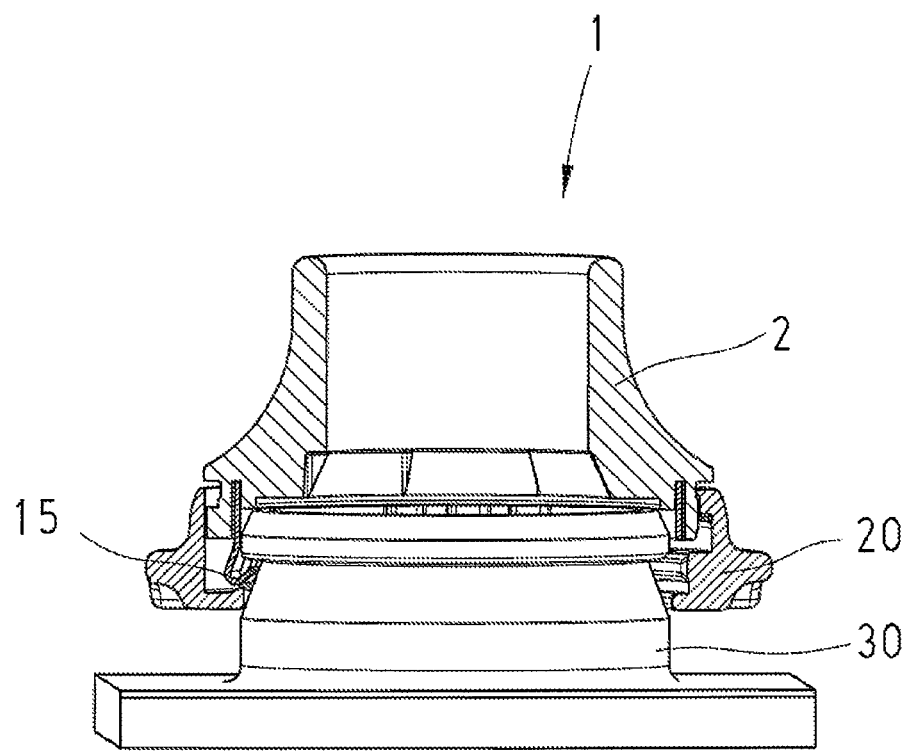
Figure 4:
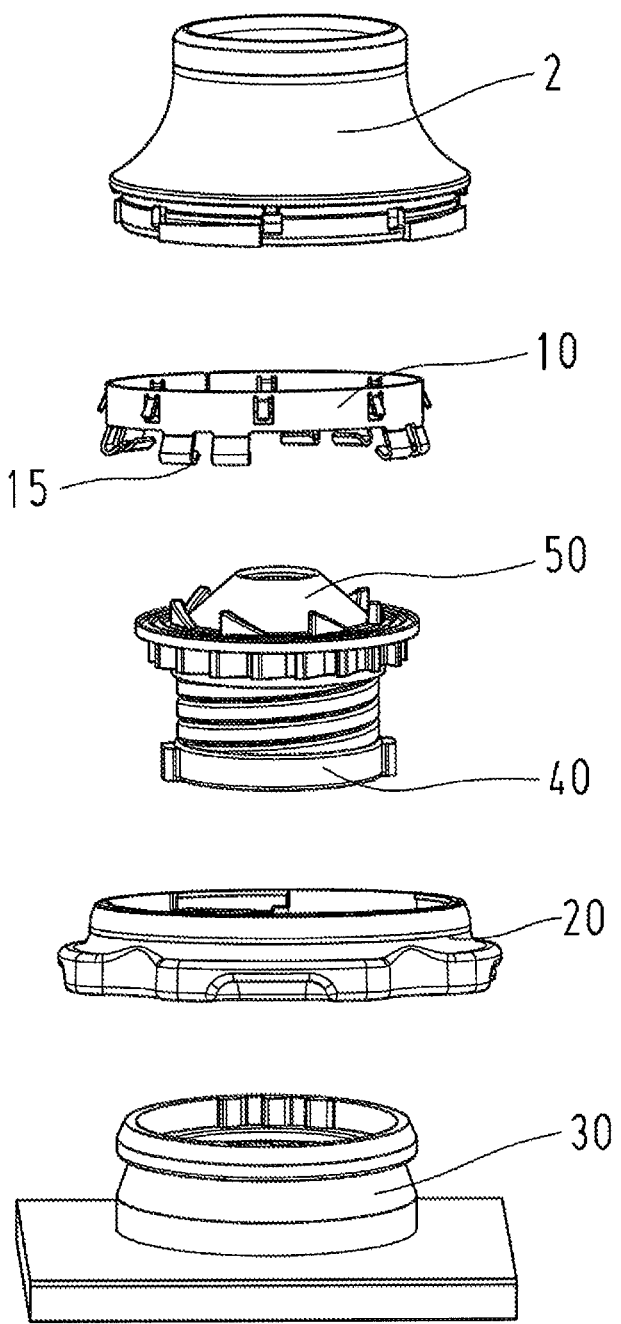
Figure 5:
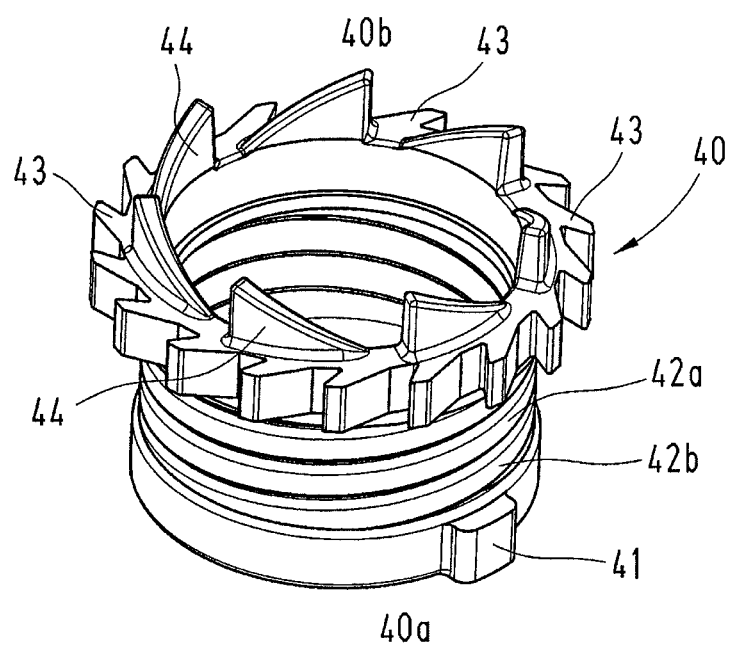
Figure 6A:
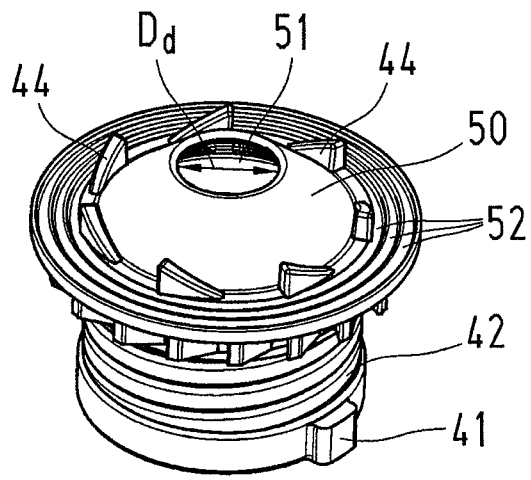
Figure 6B:
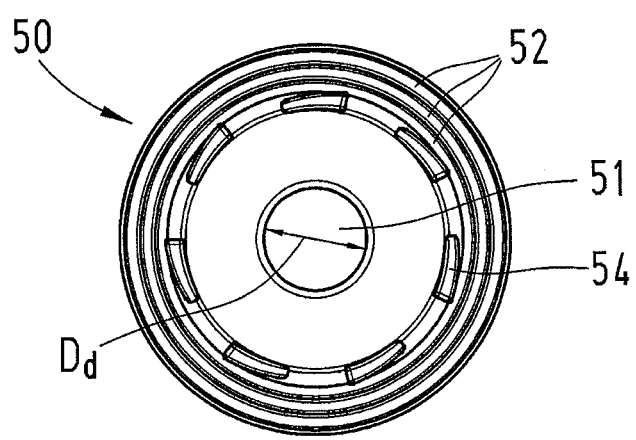
Figure 7:
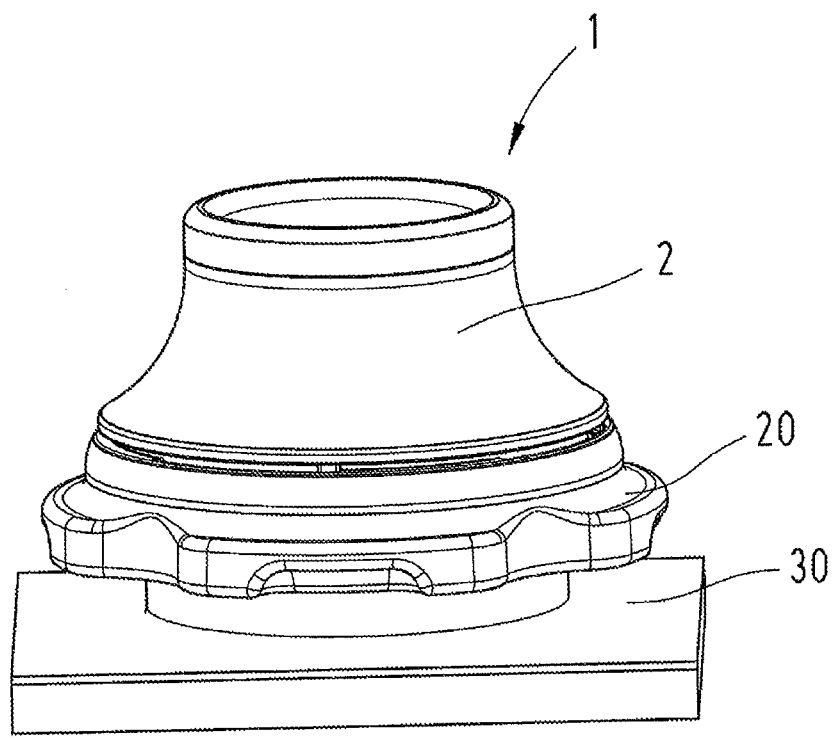

An exemplary embodiment of the invention is shown in the drawings and is explained in greater detail in the following. It shows:

FIG. 1a a perspective illustration of the locking ring,
FIG. 1b a perspective illustration of the clamping sheath
FIG. 1c a perspective illustration of the spring element,
FIG. 2 a perspective illustration of the cable outlet socket,
FIG. 3 a cross-sectioned illustration of the device for fixing the cable on the cable outlet socket,
FIG. 4 an exploded illustration of the device to fix the cable to the cable outlet socket,
FIG. 5 a perspective illustration of the tension release element in a double helix embodiment,
FIG. 6a a perspective illustration of the tension release element with the sealing element connected,
FIG. 6b a top view of the sealing element, and
FIG. 7 a device to fix the cable at a cable outlet socket with a cable tension release.

FIGS. 1a, 1b, and 1c show the individual components of the device 1 to fix a clamping sheath 2 on a cable outlet socket 30. The cable is not shown in all illustrations for reasons of clarity.

The cable outlet socket 30 (FIG. 2) is embodied essentially cylindrical and generally formed at a plug-in connector housing (not shown here). A circumferential groove 31 is inserted into the jacket surface of the cable outlet socket 30, parallel in reference to the base area 32.

The clamping sheath 2 (FIG. 1b) shows an essentially funnel-shaped form. The clamping sheath 2 comprises a cable outlet opening 5 tapering towards the direction of the cable outlet. At the locking side oblong bars 4 are formed pointing radially outwardly. At the locking side latching openings 8 are provided in the jacket of the clamping sheath 2, which latching flaps 14 of the elastic sheet 10 can engage, in order to hold it.

The locking ring 20 (FIG. 1a) is essentially embodied cylindrical. At one end the opening is constricted by a radially circumferential base ring 24. Above the base 24 oblong locking contours 26 are arranged.

Oblong bars 23 are formed at the opposite end of the locking ring 20, which are separated from each other by recesses 22. The bars 4 of the clamping sheath 2 are inserted into the recesses 22 of the locking ring 20.

The spring element 10 (FIG. 1c) is embodied annularly. Along the jacket surface the spring element 10 shows recesses in which the above-mentioned latching flaps 14 are arranged. The latching flaps 14 are slightly bent radially outwardly.

By a relative movement of the locking ring 20 in reference to the clamping sheath 2 in a so-called locking direction the latching hooks 15 of the spring sheet 10 reach the effective range of the locking contours 26 of the locking ring 20. By the locking contours 26 the latching hooks 15 are guided radially inwardly and thus engage the circumferential groove 31 of the cable outlet socket 30. The clamping sheath 2 is therefore fixed on the cable outlet socket 30. Simultaneously the bars 4 and 23 are pushed over top of each other and jam the clamping sheath 2 to the locking ring 20 according to the bayonet principle.

In an opposite rotation (opening direction) of the locking ring 20 the latching hooks 15 are moved back out of the effective range of the locking contours 26. The latching hooks 15 bend back radially to the outside.

In a rotation to the end stop (the end position) of the opening direction and a pulling up of the locking ring with the help of the unlocking contours 25 the latching hooks are pulled back out of the circumferential groove 31 of the cable outlet socket 30. The clamping sheath 2 can be removed from the cable outlet socket 30.

The locking ring 20 simultaneously encompasses the clamping sheath 2 and the cable outlet socket 30 (FIG. 3). By a rotation of the locking ring 20 into the end position of the locking direction the latching hooks 15 completely engage the circumferential groove 31 of the cable outlet socket 30. This way the clamping sheath 2 is fixed on the cable outlet socket 30.

The latching hooks 15 of the spring sheet 10 are formed thereat such that in a complete insertion of the latching hooks 15 into the circumferential groove 31 the clamping sheath 2 is slightly pulled downwards, in the direction towards the cable outlet socket 30.

In the following, the tension release of the cable and the sealing of the cable fixing device against media, such as dust and water, is discussed in greater detail.

The tension release element 40 (FIG. 5) essentially comprises rings at the ends, which are connected to each other by a helical and/or coil shaped structure 42. FIG. 5 shows a tension release element 40 with a double helix structure. This means that between the ends 40a, 40b simultaneously a clockwise and a counter-clockwise structure can be found. This way better centering of the cable is achieved in the tension release element 40.

Contours 41 pointing radially outwardly are provided at the first end 40a of the tension release element 40, which can be inserted into matching recesses 33 of the cable outlet socket 30. This way the first end 40a of the tension release element 40 is fixed in the cable outlet socket 30 in a torque-proof fashion.

At the second end 40b the tension release element 40 comprises latching hooks 43 pointing radially outwardly. They latch with the latching contours 34 in the upper part of the cable outlet socket 30 such that the end 40b can also be fixed in a torque-proof fashion.

Furthermore, at the second end 40b the tension release element 40 comprises entraining hooks 44 pointing axially upwards, which cooperate with entraining contours 6 of the clamping sheath 2. The entraining hooks 44 show essentially the form of a saw tooth. By rotating the clamping sheath (in reference to the cable outlet socket) in the direction of the falling flank of the entraining hooks 44 the second end 40b of the tension release element 40 is moved in reference to the first end 40a and the helical structure is constricted between the ends 40a, 40b. Any cable guided therebetween is clamped and this way tension release is realized for the cable.

With a rotation of the clamping sheath 2 opposite the falling flank of the entraining hook 44 the entraining hooks 44 glide along the entraining contours 6 of the clamping sheath 2. The ends 40a, 40b are not moved in reference to each other.

In an oscillating motion of the clamping sheath 2 the helical and/or coil structure can be tightened around the cable jacket of the cable to be connected, similar to using a ratchet. No additional tool is required, here.

The second end 40b of the tension release element 40 is connected to the sealing element 50 (FIG. 6a, FIG. 6b). Here, the entraining hooks 44 project through recesses 54. The cable to be connected is guided through the opening 51 of the sealing element 50. The diameter Dd of this opening is respectively smaller than the diameter of the cable to be connected.

At the outside the sealing element 50 comprises compression lamellae 52. They ensure sufficient compression force of the seal upon the cable outlet socket 30.

The clamping sheath 2 partially encompasses the jacket surface of the cable outlet socket 30. A circumferential edge 7 is formed inside the clamping sheath 2. The sealing element 50 is arranged between this edge 7 and the brim 35 of the cable outlet socket 30 in the assembled state of the device 1.

The internal sealing lamellae 53 along the opening 51 reinforce the material thickness of the elastomer and thus increase the compression (sealing force) towards the cable jacket.

FIG. 7 shows all components of the device for fixation, sealing, and tension release of a cable to be connected to a cable outlet socket of a plug-in connector, switchboard, or the like in an effective connection.

List of Reference Characters
Device for Fixing a Cable to a Cable Outlet Socket

| | |
|---|---|
| 1 | Device for fixing the cable |
| 2 | Clamping sheath |
| 4 | Oblong bars |
| 5 | Cable opening |
| 6 | Entraining contour (inside) |
| 7 | Circumferential edge |
| 10 | Spring element |
| 14 | Latching flaps |
| 15 | Locking hooks |
| 20 | Locking ring |
| 22 | Recess |
| 23 | Oblong bar |
| 24 | Base ring |
| 25 | Unlocking contour |
| 26 | Locking contour |
| 30 | Cable outlet socket |
| 31 | Circumferential groove |
| 32 | Base area |
| 33 | Recesses |
| 34 | Latching contours |
| 40 | Tension release element |
| 41 | Contour |
| 40a | First end |
| 40b | Second end |
| 42 | Helical and/or coil structure |
| 42a | Clockwise helical structure |
| 42b | Counter-clockwise helical structure |
| 43 | Latching hooks |
| 44 | Entraining hook |
| 50 | Sealing element |
| 51 | Opening |
| 52 | Compression lamellae |
| 53 | Sealing lamellae |

The invention claimed is:

1. A device for fixing a cable to a cable outlet socket (30), comprising a clamping sheath (2), a spring element (10), and a locking ring (20), characterized in that
the spring element (10) comprises at least one locking hook (15),
which by a relative motion of the locking ring (20) in reference to the clamping sheath (2) can be inserted into a circumferential groove (31) of the cable outlet socket (30),
and that the locking hooks (15) of the spring element (10), upon rotation of the locking ring (20) into an end position of a first direction (locking direction), are completely inserted in the circumferential groove of the cable outlet socket (30), so that the clamping sheath (2) is held on the cable outlet socket (30) so that it cannot be lost.

2. A device according to claim 1, characterized in that the locking ring (20) comprises at least one locking contour (26) which in a relative motion of the locking ring (20) in reference to the clamping sheath (2) acts at least upon one locking hook (15) of the spring element (10) such that at least one locking hook (15) can be inserted radially inwardly into the circumferential groove (31) of the cable outlet socket.

3. A device according to claim 1, characterized in that the latching hooks (15) of the spring element (10), upon rotation of the locking ring (20) into an end position of a second direction (opening direction), the latching hooks (15) are removed entirely out of the circumferential groove of the cable outlet socket (30) so that the clamping sheath (2) can be removed from the cable outlet socket (30).

4. A device according to claim 1, characterized in that the clamping sheath (2) comprises radial bars (4) which can be inserted axially into recesses (22) of the locking ring (20), with the bars (4), upon a relative motion of the locking ring (20) towards the clamping sheath (2) cooperates with radial bars (23) of the locking ring (20) such that the clamping sheath (2) and the locking ring (20) are clamped to each other.

\* \* \* \* \*